Figure 1:
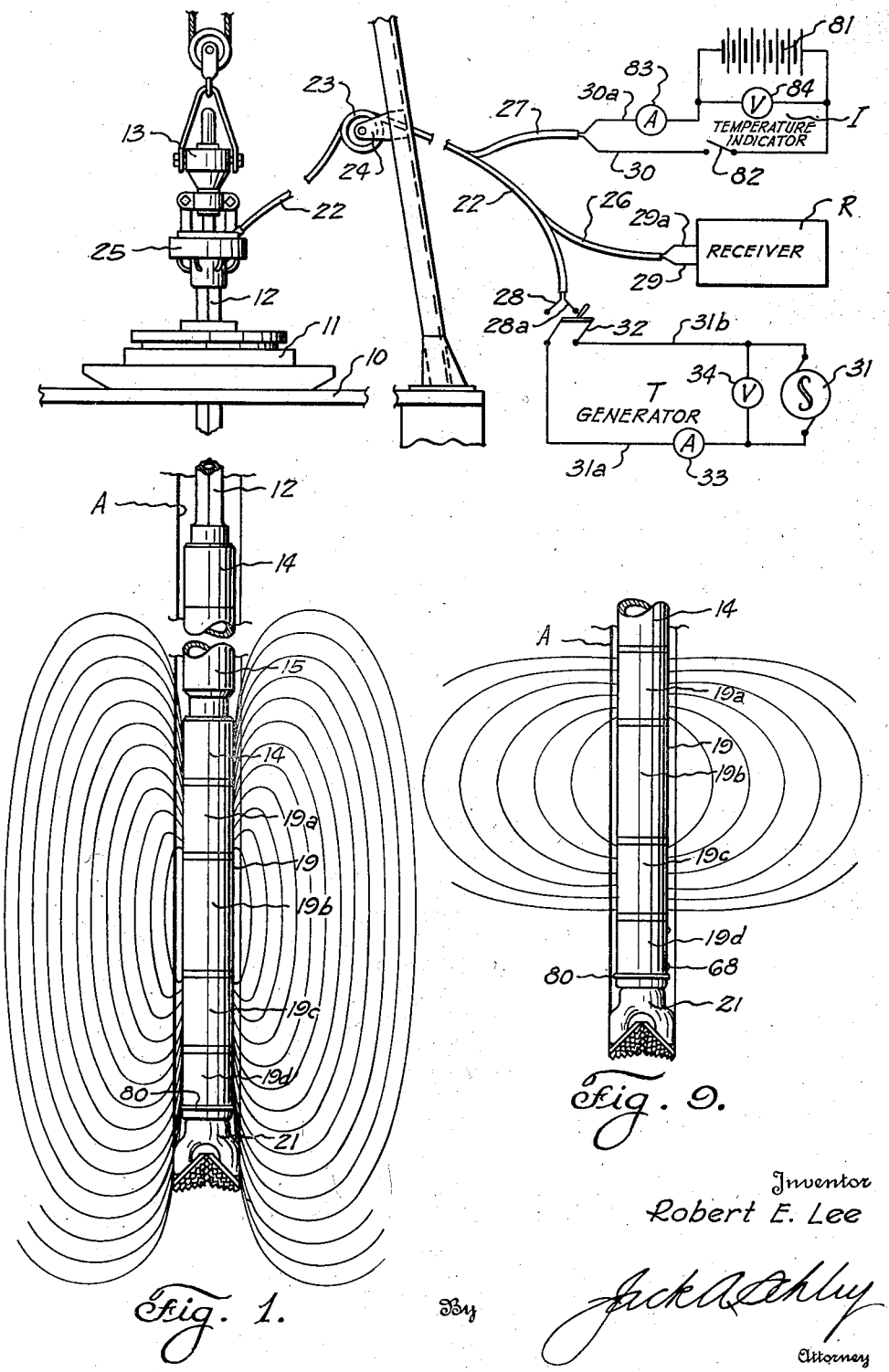

March 9, 1943.  R. E. LEE  2,313,384
MEANS FOR DETERMINING THE TECTONICS AND NATURE OF SUBSURFACE GEOLOGY
Filed April 28, 1939  4 Sheets-Sheet 2
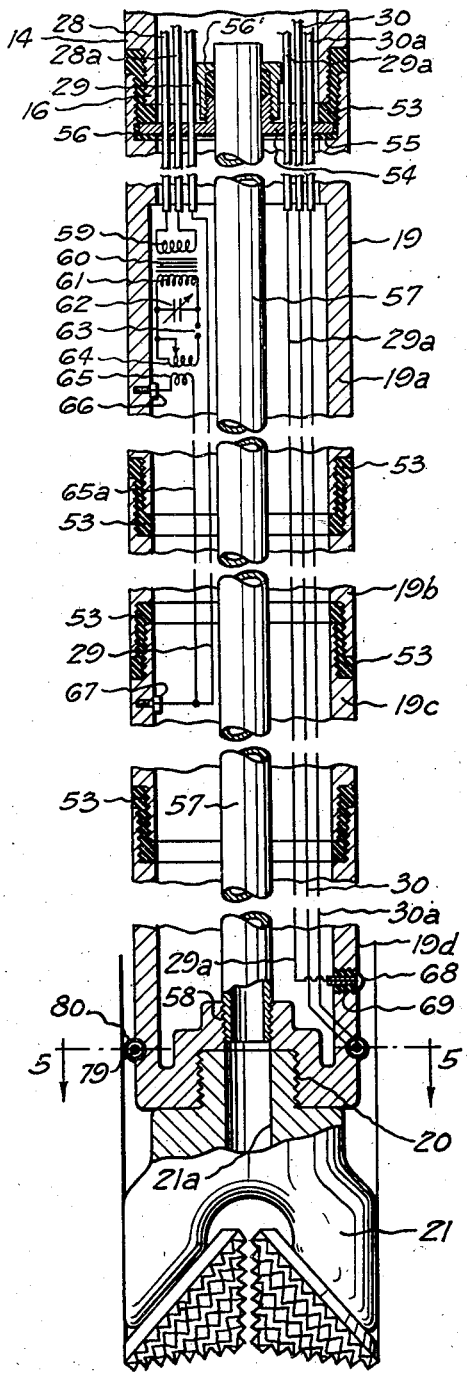
Fig. 2.
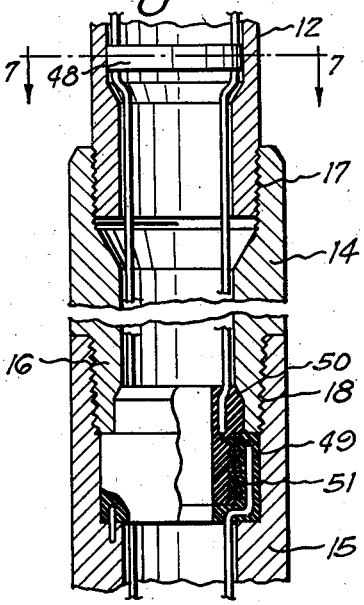
Fig. 3.
Fig. 4.
Inventor
Robert E. Lee
By Jack A. Ashley
Attorney March 9, 1943.    R. E. LEE    2,313,384
MEANS FOR DETERMINING THE TECTONICS AND NATURE OF SUBSURFACE GEOLOGY
Filed April 28, 1939    4 Sheets-Sheet 3

Inventor
Robert E. Lee

Attorney

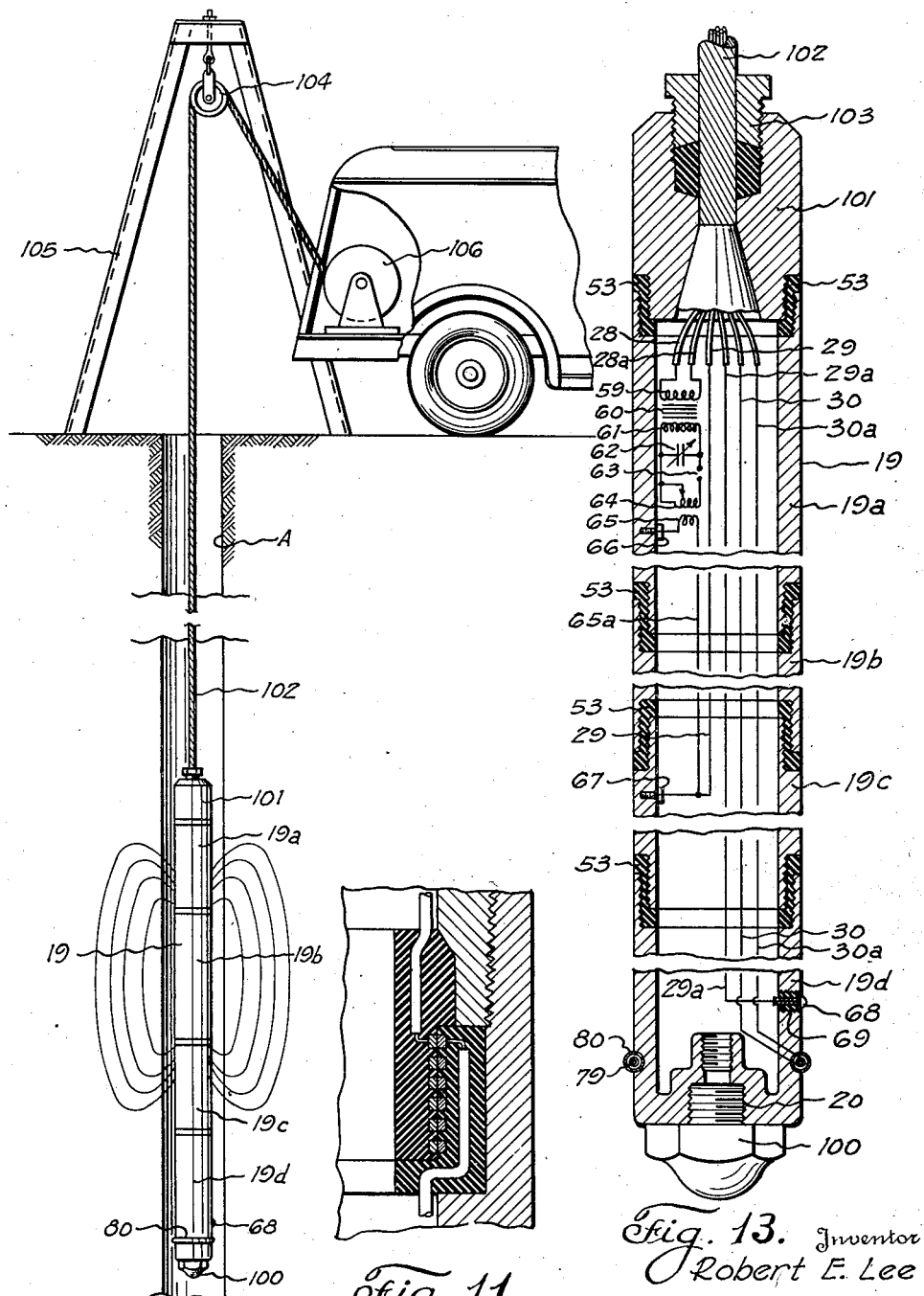

Patented Mar. 9, 1943

2,313,384

UNITED STATES PATENT OFFICE 2,313,384

MEANS FOR DETERMINING THE TECTONICS AND NATURE OF SUBSURFACE GEOLOGY

Robert E. Lee, Coleman, Tex., assignor, by mesne assignments, to Joseph H. Reynolds Application April 28, 1939, Serial No. 270,503

5 Claims. (Cl. 175—182)

This invention relates to new and useful improvements in means for determining the tectonics and nature of subsurface geology.

One object of the invention is to provide an improved method of geophysical survey whereby the tectonics and nature of the subsurface formations may be determined through the medium of an electrical current, either direct or alternating.

An important object of the invention is to provide an improved electrical method of geophysical survey which may be employed either during the drilling operation, or subsequent thereto, whereby the nature and structure of the formations in advance of the drilling tool, or immediately surrounding said tool, may be determined.

Another object of the invention is to provide an improved method of geophysical exploration, wherein temperature surveys are made of the formation being explored, in conjunction with electrical surveys, whereby additional data and bases are provided for accurate calibration to ascertain the resistivity, conductivity and salinity of the formation and thereby accurately determine the structure and nature of said formation.

Another object of the invention is to provide an improved method by which a continuous record may be obtained of the nature and tectonics of the formations traversed during the drilling operation, whereby an accurate log may be produced without the necessity of subsequent surveys.

A further object of the invention is to provide an improved method whereby the inherent terrestrial temperature of the formations may be ascertained so that said temperatures may be taken into consideration when determining the resistivity, conductivity and salinity of the formations, which assures more accurate information as to the structure of said formation.

A particular object of the invention is to provide an improved method, of the character described, wherein regional surveys may be made of formations as a bore hole is progressively surveyed, thereby enabling an operator to determine and locate nonconformities, lensing and shore line conditions, such as lenticular sands, in the subsurface geology.

Still another object of the invention is to provide an improved apparatus adapted to be associated with a rotating drilling tool, which is constructed so that the nature and tectonics of the subsurface formations surrounding, or in advance of the drilling tool, may be determined, whereby an accurate log of the underground structure may be produced.

A further object of the invention is to provide an improved apparatus for geophysical exploration, wherein the inherent terrestrial temperature of the formation is determined and also wherein the resistivity, conductivity and salinity of said formation is determined; such information yielding valuable information as to the underground structure.

Still another object of the invention is to provide an improved apparatus, of the character described, which will enable surveys to be made of wells being drilled with either rotary or cable tools, said apparatus permitting electrical and temperature surveys to be made during the actual drilling operation, or subsequent thereto.

A construction designed to carry out the invention will be hereinafter described, together with other features of the invention.

Figure 5:
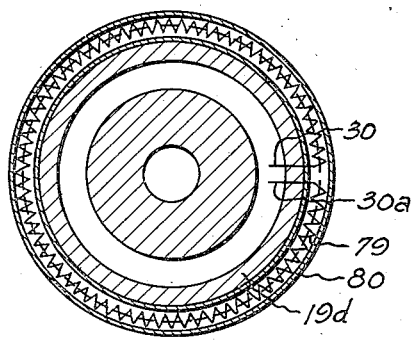
Figure 6:
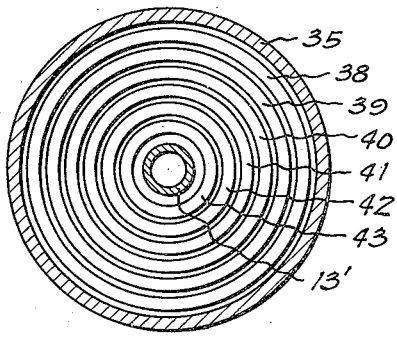
Figure 8:
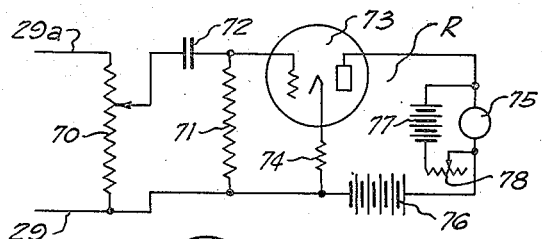
Figure 7:
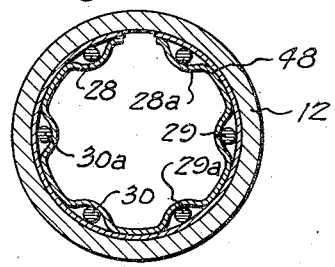
Figure 10:
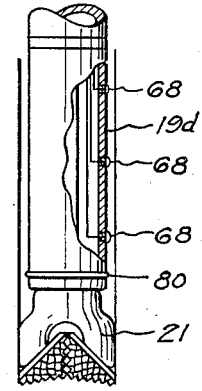

The invention will be more readily understood from a reading of the following specification and by reference to the accompanying drawings, in which an example of the invention is shown, and wherein:

Figure 1 is an elevation of the apparatus, constructed in accordance with the invention, for performing the improved method, said apparatus being shown in a well bore, Figure 2 is an enlarged, partial, transverse, sectional view of the lower portion of the apparatus, Figure 3 is an enlarged view, partly in section and partly in elevation, showing the connection between the swivel and rotating drill stem, Figure 4 is an enlarged, transverse, vertical, sectional view of one of the coupling elements between the drill stem sections, Figure 5 is a horizontal, cross-sectional view, taken on the line 5—5 of Figure 2, Figure 6 is a horizontal, cross-sectional view, taken on the line 6—6 of Figure 3, Figure 7 is a horizontal, cross-sectional view, taken on the line 7—7 of Figure 4, Figure 8 is a wiring diagram of the receiving and measuring circuit and instruments, Figure 9 is an elevation of the lower portion of the drill stem and illustrating the general shape of the electrical field when generated into a formation of relatively low resistivity, Figure 10 is a view, partly in section and partly in elevation, of a slightly modified form of the invention, Figure 11 is an enlarged detail of the electrical connection at each tool joint, Figure 12 is an elevation of a modified form of the invention, illustrating the same lowered in a well bore, and Figure 13 is an enlarged, transverse, vertical, sectional view of this modified form.

This application is filed as a continuation in part of my copending application filed March 28, 1938, Serial No. 198,546.

In the drawings, the numeral 10 designates the floor of a conventional derrick, on which the usual rotary table 11 is mounted. An angular drive member or kelly 12 extends through the rotary table and is arranged to be rotated thereby, the upper end of said kelly being supported by the usual swivel 13 which is suspended from the top of the derrick (not shown). The lower end of the kelly 12 is connected, by means of a coupling 14, to the drill pipe 15, which pipe extends downwardly through the well bore A. The coupling 14 is, in fact, a tool joint and, as is clearly shown in Figure 4, includes a pin section 16 provided with a threaded bore 17, which bore is arranged to receive the lower screw-threaded end of the kelly 12. The pin section 16 of the tool joint is adapted to be threaded into the socket of the usual tool joint box 18. The box 18 is shown as formed integral with the upper end of each section of the drill pipe 15, but if desired said box could be made separately and the drill pipe threaded into the lower end thereof. The various sections of the drill pipe are coupled together by means of the tool joint 14 and the lowermost section of drill pipe is connected with an elongate housing 19, wherein the electrical surveying apparatus, as will be hereinafter described, is mounted. The lower end of the housing 19 is provided with an axial screw-threaded socket 20, whereby a suitable drill bit 21, of any desired construction, may be secured to said housing.

The kelly 12, together with the drill stem 15, housing 19 and drill bit 21, are suspended from the swivel 13, which swivel is, in turn, suspended from the top of the derrick. The provision of the swivel 13 permits a rotation of the kelly 12 when the rotary table 11 is revolved. A rotation of the kelly will rotate the drill pipe 15, whereby the drill bit 21 is rotated to perform the drilling operation. This general arrangement is common practice in the well drilling art and has been shown and described merely for the sake of clarity.

The survey apparatus which is located within the housing 19 is electrically operated and it is necessary that electrical current be conducted downwardly to this apparatus. Also, it is necessary that readings or indications be taken at the surface and other lead wires must extend through the drill stem and kelly for this purpose. The lead wires which are necessary for the operation of the device are housed within a suitable cable 22 which is wound on a reel 23 carried by suitable supports 24, as is clearly shown in Figure 1. The supports 24 are preferably secured to one of the derrick legs. One end of the cable 22 is connected to a commutator assembly 25 which is mounted on the upper end of the kelly 12, as will be hereinafter explained. The other end of the cable 22 is connected with a transmitting or generating circuit T, which is shown schematically in Figure 1. The cable is provided with a branch lead 26 which has connection with a suitable receiver, as will be hereinafter explained. A second branch lead 27 extends from the cable 22 and has connection with a suitable temperature indicator I. The cable 22 and its leads 26 and 27 house six wires 28, 28a, 29, 29a, 30 and 30a. The wires 28 and 28a have connection with the transmitter or generator T, the wires 29 and 29a have connection with the receiver R, while the wires 30 and 30a have connection with the temperature indicator I.

The transmitting circuit T includes a suitable source of electricity such as an alternating current generator 31. It is noted, however, that any source of electrical current, either alternating or direct, may be employed. Lead wires 31a and 31b extend from the generator 31 and are arranged to be connected through a manually operated switch 32 with the wires 28 and 28a which extend through the cable 22. An ammeter 33 is connected in the wire 31a and a volt meter 34 is positioned across the circuit, as is clearly shown in Figure 1. When the switch 32 is closed, the generator 31 will generate and transmit electrical current over the wires 28 and 28a, as will be hereinafter explained.

For making an electrical connection between the cable 22, which is stationary, and the rotating drive element or kelly 12, the commutator assembly 25 is provided. This assembly is clearly shown in Figure 3 and includes an annular housing 35, which is formed with a depending collar 36. The collar 36 is internally screw-threaded to receive the upper end of the kelly 12. A commutator disk 37, which is constructed of an insulating material, is mounted within the annular housing 35 so as to be rotatable therewith. This disk has a plurality of concentric contact rings 38, 39, 40, 41, 42 and 43 mounted thereon. The contact rings are arranged to be engaged by a plurality of spring-pressed brushes 38', 39', 40', 41', 42', and 43', which brushes are mounted within a circular block 44. The block has its lower portion disposed within the annular housing 35 and is formed with upwardly extending arms 45 which are secured by means of a clamp 46 to the swivel 13. A short pipe 13' has its upper end connected to the swivel 13, while its lower end is threaded into the collar 36 so as to communicate with the bore thereof, whereby drilling fluid may be circulated downwardly through the swivel, then through the pipe 13' and into the kelly 12.

With the arrangement of the commutator assembly, the block 44 which carries the spring-pressed brushes is fixed to the swivel and is non-rotatable. The contact rings which are carried by the commutator disk are rotatable with the annular housing 35 which is carried by the upper end of the rotating kelly 12. Since the brushes are in constant engagement with the contact rings, it will be manifest that the electrical connection between the brushes and the rings will be maintained during rotation of the kelly or drive element 12.

The cable 22, which houses the six lead wires, as has been explained, is connected to the non-rotatable block 44. The wires 28 and 28a are connected to the brushes 38' and 39', which brushes engage the outermost rings 38 and 39. The wires 29 and 29a, which lead from the receiver, are connected to the brushes 40' and 41', which brushes are in engagement with the contact rings 40 and 41. The wires 30 and 30a, which lead from the temperature indicator I, are connected to the innermost brushes 42' and 43', which brushes engage the rings 42 and 43.

For conducting the current downwardly through the kelly 12 and through the drill stem and finally to the housing 19, lead wires extend from the rings 38 to 43. Since these wires are, in effect, a continuation of the six lead wires housed within the cable 22 and branch leads 26 and 27, said wires have been given a corresponding number. Therefore, lead wires 28 and 28a lead downwardly from the contact rings 38 and 39, lead wires 29 and 29a lead downwardly from the contact rings 40 and 41, while the wires 30 and 30a lead downwardly from the rings 42 and 43. As is clearly shown in Figure 3, each of these wires extend through an opening 47 in the wall of the collar 36 and are then turned downwardly to extend through the bore 12a of the kelly 12.

The wires which extend downwardly through the kelly 12 are held against the wall of said kelly by a suitable split ring 48, which ring is constructed of a spring metal. The ring is clearly shown in Figure 7 and serves to keep the wires separated from each other and in close proximity with the wall of the bore.

For making and continuing the electrical connection of the wires through the tool joint 14, the bore of said tool joint is provided with a pair of contact members 49 and 50 (Figure 4). The member 49 is in the form of a collar which is disposed within the socket of the tool joint box 18. A plurality of contact rings 51 are mounted in the bore of the collar 49 and the lead wires are connected to these rings. The member 50 is in the form of a block and has a plurality of contact rings on its outer surface, which rings are connected to the wires passing downwardly through the drill stem. When the tool joint is made up, the block 50 is moved into the collar 49, whereby the contact rings of these two members are moved into registration and engagement with each other, whereby when the joint is completely made up, an electrical connection is established therethrough.

The lowermost section of the drill pipe 15 is connected into the pin section 16 of the lowermost tool joint 14. This pin section is, in turn, threaded into the upper end of the housing 19, as is clearly shown in Figure 2. A suitable insulating bushing 53, preferably constructed of a non-ferrous insulating material, is interposed between the pin section 16 and said housing, whereby the housing is insulated from the drill stem 15. A transverse plate 54 is clamped between the end of the pin section 16 and a shoulder 55 formed within the upper end of the housing 19 and this plate rests on a suitable sealing ring 56, whereby the periphery of the plate is in fluid-tight engagement with the wall of the housing. A stuffing box 56' extends upwardly from the plate and has the upper end of a tubular conductor 57 extending therethrough. The conductor 57 extends axially through the housing 19 and has its lower end threaded into an opening 58 which is provided in the bottom of said housing. The opening 58 communicates with the bore 21a of the drill bit 21 and, manifestly, a drilling fluid, which may be circulated downwardly through the drill stem 15, may flow through the conductor 57 and to the bit 21 in order to lubricate the cutting element of said bit. Since the partition 54 has its peripheral portion sealed, it is evident that the drilling fluid cannot pass downwardly into the interior of the housing 19. The wires 28, 28a, 29, 29a, 30 and 30a, which lead from the unit at the surface, pass through suitable openings in the plate 54, whereby the lower ends of said leads extend into the interior of the housing 19. It is noted that suitable packing elements may be disposed within the openings in the plate and around the lead wires to prevent the drilling fluid from passing into the housing 19.

The housing 19 is constructed of four sections 19a, 19b, 19c and 19d. The sections 19a, 19b and 19c are tubular and are coupled together by threaded engagement. Each section is insulated from the other by means of one of the insulating bushings 53, whereby each section is electrically insulated from the other. The uppermost section 19a forms an oscillator zone, while the third section 19c provides a lower or current return zone, the intermediate section 19b serving as an insulating neutral zone between the oscillator zone and the return zone. The lowermost section 19d is, of course, connected to the section 19c and has its lower end directly connected to the drill bit 21, as has been explained. The entire intermediate section 19b may be constructed of an electrical insulating or non-ferrous material to assure its insulation from the other sections.

The electrical apparatus, which is housed within the housing 19, has been shown schematically and, as explained, the lead wires from the surface extend downwardly into the interior of the housing. Referring to Figure 2, it will be seen that the wires 28 and 28a, which wires lead from the generator T, are connected to the primary coil 59 of a transformer which is mounted within the upper section 19a of the housing. The purpose of the transformer is to change the low voltage alternating current into a high voltage alternating current. The transformer includes the usual core 60 which is interposed between the primary coil and a secondary coil 61. A variable condenser 62 is arranged across the secondary circuit of the transformer and said secondary circuit also includes a fixed spark gap 63 and a variable inductance coil 64. If desired, a vacuum tube of suitable construction may be substituted for the spark gap. A coupling coil 65 is connected to a contact 66, which contact is threaded into the wall of the section 19a. This latter coil also has connection through a wire 65a with a second contact 67 which is threaded into the third section 19c of the housing and, with this arrangement, it will be obvious that the contacts 66 and 67 which are connected to the coupling coil 65, are insulated from each other being separated by the intermediate section 19b which is insulated from the sections 19a and 19c. The contacts 66 and 67 also have connection with the wire 29 which leads downwardly through the plate 54. It is noted that the upper end of the wire, after passing through the commutator assembly 25, extends through the cable 22 and then through the lead 26 and finally connects to the receiver R.

The other lead wire 29a of the receiver R extends downwardly through the cable 22 and then through the drill stem 15, as explained, and into the interior of the housing 19. This wire, as is clearly shown in Figure 2, extends downwardly through the sections 19b, 19c and into the interior of the lowermost section 19d of the housing. The wire has connection with a metallic contact 68, which contact has its outer end exposed to the exterior of the housing. The contact 68 is mounted within a bushing 69, which is constructed of an insulating material, whereby said contact is insulated from the section 19b.

The receiver R, which is connected to the lead wires 29 and 29a extending from the contacts 67 and 68, respectively, is schematically shown in Figure 8. The receiver comprises a square law vacuum tube voltmeter and the lead wires 29 and 29a are connected to a variable resistance 70. A resistance 71 is arranged across the circuit, with a condenser 72 being interposed between the resistances 70 and 71. A vacuum tube 73 is connected in the circuit, being connected in parallel to the above described circuit through a resistance 74. A recording milliammeter 75 is also connected in the circuit, which circuit is supplied with direct current by a battery 76. A bucking battery 77 is connected across the milliammeter and its circuit includes a variable resistance 78. The purpose of the variable resistance is to enable an operator to neutralize the effects of terrestrial magnetism and the electrical phenomena inherent in the region which is being explored, as will be explained.

From the foregoing, it will be seen that the lead wires 28 and 28a serve to conduct an electrical current downwardly through the transformer and to the region being explored, whereby an electrical field will be generated in the subsurface formation surrounding the drill stem. The lead wires 29 and 29a serve to operate the receiver R at the surface to indicate the effect of the electrical field which is set up in the formation. The lead wires 30 and 30a which lead from the temperature indicator I extend downwardly through the drill stem 15 and through openings in the plate 54, the lower ends of said wires extending downwardly through the sections of the housing 19. The lower ends of the wires 30 and 30a are connected with a thermoresistance coil 79, which coil surrounds the lower end of the section 19d of the housing (Figures 2 and 5). The coil is constructed of an insulated wire which is disposed within a hermetically sealed annular chamber or tube 80. As explained, the upper ends of the wires 30 and 30a are connected to the circuit of the temperature indicator I, which is diagrammatically shown in Figure 1. This circuit includes a battery 81, or other source of direct current, which battery has its opposite sides connected to the wires 30 and 30a. A suitable manual switch 82 is connected in the wire 30, while an ammeter 83 is connected in the wire 30a. A voltmeter 84 is arranged across the circuit, as illustrated.

It is well known that the resistance of an insulated thermoresistance coil will vary with the temperature of the surrounding medium and, therefore, if the temperature surrounding the coil is higher, a different resistance is had than if a lower temperature is present around said coil. According to Ohm's law, the readings of the voltmeter 84 and the ammeter 83 in the indicating circuit I, which vary with the resistance of the coil 79, will indicate the temperature adjacent said coil. Thus, by observing the ammeter and voltmeter in the circuit I, it is possible to determine the resistance of the coil 79 and thereby arrive at the temperature in the well bore adjacent said coil.

It is also well known that the temperature of matter affects its electrical conductivity or resistivity. Therefore, in passing an electrical current through a body, its is desirable to know the temperature of that body in order to properly calibrate the conductivity or resistivity thereof. For this reason, the provision of the thermoresistance coil 79 makes it possible for the operator to know the temperature within the bore surrounding the coil at all times. When the operator determines this temperature, he can utilize the information to properly calibrate the conductivity or resistivity of the surrounding formation, as will now be explained.

In practicing the improved method with the apparatus disclosed herein, the bit is first lowered into the bore and the calculations may be made during the drilling operation. When a reading is to be taken, the first reading is that of the temperature indicator I. This reading is taken while the drill bit is at rest and is not under rotation. The indication which is obtained will indicate the inherent terrestrial temperature and such indication is noted. The temperature of the drilling fluid which is being circulated downwardly through the drill stem and upwardly through the bore outside of said drill stem is then determined. This temperature, as it affects the temperature of the bore adjacent the housing 19, will be indicated by the differential between the temperature of the drilling fluid which is introduced into the upper end of the kelly 12 and the temperature of the drilling fluid as it escapes from the upper end of the bore. By noting this temperature differential, the operator can determine the heat transfer which occurs through the circulating drilling fluid and the formation which it contacts during its circulation. In other words, if the drilling fluid is introduced into the kelly at one temperature and is discharged from the upper end of the well bore A at a higher temperature, this will indicate to the operator that the highest temperature within the bore is approximately that of the discharging drilling fluid, and such highest temperature ordinarily is at the bottom of the bore. Thus, the operator can take into consideration the temperature rise or drop in the fluid which is brought about by the circulation of the drilling fluid.

After the indications on the indicator I, and the temperature differential of the circulating fluid, have been noted, the rotary table 11 may be rotated to rotate the kelly 12. Such rotation will result in a rotation of the drill stem 15 and a rotation of the drill bit 21, whereby the drilling operation is performed. It is obvious that the rotation of the drill bit, as it engages the formation to perform the drilling operation, will create a friction which will result in additional heat at the bottom of the well bore. Such heat which is the result of the friction will, of course, act upon the thermoresistance coil 79 to change the indication or reading on the indicator I. By noting such change in the indicator reading, and keeping in mind the previous reading, as well as the temperature differential in the circulating fluid, the operator may readily calibrate the inherent terrestrial temperature of the medium or media which is adjacent the drilling bit. Therefore, as the bit moves downwardly through the various formations traversed by the well bore A, the operator is at all times advised of the inherent terrestrial temperature of said formations as the bit moves therethrough.

To determine the nature of the formation adjacent the housing 19, the switch 32 of the generator T is closed so as to connect said generator with the wires 28 and 28a. When this occurs, an electrical current is conducted to the primary coil 59 of the transformer, which is located in the upper section 19a of the housing 19. The transformer acts to increase the voltage to a predetermined degree and a high frequency is obtained through the medium of the variable condenser 62, spark gap 63 and variable inductance coil 64. It is noted that the setting of the variable inductance is predetermined and is held constant throughout the survey, whether such survey is made during the drilling operation or is made subsequent thereto.

As has been explained, the coupling coil 65 is connected to the electrical contacts 66 and 67, which contacts are mounted or connected with the sections 19a and 19c of the housing, said contacts being separated by the insulated section 19b. Thus, it will be seen that a current of high frequency of predetermined characteristics is propagated and imposed upon the media surrounding the neutral zone, that is, that zone occupied by the intermediate section 19b. The propagation of this high frequency current forms an electrical field, as is schematically illustrated in Figures 1 and 9, and the characteristics of this field are relative to the conductivity, resistivity and salinity of the surrounding media. It is pointed out that by varying the length of the section 19b, the size of the electrical field may be varied to cover more or less area. To avoid setting up a field between the section 19a and the drill stem, the lowermost sections of said stem may be of insulating or non-ferrous material.

It is well known that when an electric field is set up within a media, the electric field pattern is dependent upon the character or nature of said media. In other words, if the media is of high resistivity and low conductivity, the field pattern will be as illustrated in Figure 1, with the lines of force extending vertically rather than radially outwardly from the bore. If the media is of a high conductivity and low resistivity, such as a porous formation saturated with salt water, then the electrical field pattern will be as shown in Figure 9, with the lines of force extending a relatively far distance outwardly from the bore. Thus, it will be seen that the field pattern which occurs when the electrical field is formed varies with the particular formation or strata which is adjacent the point of generation.

Referring again to Figure 1 which illustrates the field pattern when the neutral zone is surrounded by a media of high resistivity, it will be observed that the electrical lines of force are arranged to engage the metallic contact 68. This contact, as has been explained, is connected by the lead wire 29a to the receiver R. Consequently, distortion of the lines of force will impose a change in voltage on the receiver circuit, which distortion will vary as a function thereof. Therefore, when the lines of force are as shown in Figure 1, the intensity of the electrical field adjacent the contact 68 is much greater than it is when the field pattern is as in Figure 9, with the result that an indication on the milliammeter 75 of the receiver will indicate the distortion of the lines of force or the electrical field pattern. When the field pattern is as in Figure 1, it is obvious that the electrical lines of force, under certain conditions, will penetrate media below the earth boring tool, and hence surface indications may be made relative to the strata to be encountered as drilling proceeds. Manifestly, when the field pattern is known, this indicates the penetration of the electrical lines of force radially through the strata or formations, whereby the nature and tectonics of said formations may be determined. When the inherent terrestrial temperature, as previously determined by means of the thermoresistance coil 79 and the indicator I, is considered along with the particular field pattern which is set up, an accurate knowledge of the nature and characteristics of the formation being explored may be obtained. As the temperature varies, so does the resistivity and conductivity of a particular formation vary. With the method and apparatus herein described, all of the conditions, which enter into an electrical survey of the formations, are ascertained, whereby an accurate survey is possible. It is noted that the field pattern is determined directly at the zone being surveyed which makes for more accurate information; also the survey may be made while the drilling operation is being performed or, if desired, the survey may be made while the drill bit is inactive and subsequent to the drilling.

In Figure 10, a slightly modified form of the invention is shown. It may be that in some instances and under certain conditions, that a single contact 68 would be insufficient to provide an accurate reading on the receiver. In such cases, it would be possible to provide a plurality of the contacts 69, which contacts are mounted in the wall of the lowermost section 19d of the housing 19. Each contact 68 would be connected to an individual receiver (not shown) and, by noting the readings, as affected or controlled by each contact, a more accurate indication of the distortion of the field pattern could be obtained. Thus, it will be seen that the invention is not to be limited to the use of a single contact 68 as any desired number may be employed.

As before stated, the method may be performed either during the drilling operation and while the drill bit is rotating, or subsequent thereto. The electrical and temperature surveying unit, herein described, may be operated in a bore hole which has been previously drilled by means of a cable instead of a drill stem, the units of the circuit being encased within the cable, insulated from each other and from the cable.

In Figures 1 to 11, the invention has been shown and described as applied to a drill stem and bit, whereby surveys may be made during or subsequent to the drilling operation. However, it is noted that, if desired, the housing 19 may be a separate unit and may be lowered through a pre-drilled bore hole on a wire line or cable. Such an arrangement is clearly shown in Figures 12 and 13, wherein the housing 19 and its associate parts are of substantially the same construction. However, in this form, the lower end of the housing is closed by a bull plug 100 which is threaded into the axial opening 20 in the bottom of said housing. The upper end of the housing has a cable socket 101 threaded thereinto and a cable 102 has its lower end secured within the socket in the usual manner. A packing gland 103 surrounds the cable and is located within the upper end of the socket for packing off around said cable. In this form, the vertical pipe or conductor 57, as well as the transverse partition 54, are omitted and the various lead wires 28, 28a, 29, 29a, 30 and 30a are housed within the cable 102.

The cable extends upwardly from the well bore and passes over a pulley or sheave 104 which is suspended from the derrick or from a tripod 105 provided for the purpose. The cable is wound on a suitable reel or drum 106 which may be stationary, or which may be mounted on a truck, or other vehicle, as illustrated. When the reel is supported on a vehicle, the transmitting, receiving and indicating instruments and equipment are mounted within the truck. The operation of this form is exactly the same as the form, wherein the apparatus is connected in the drill stem. The cable supported unit involves less time in making the surveys for it may be lowered and raised much more quickly. In both instances, an electrical field is set up in the formation adjacent the unit and the measurement of the distortion of said field is taken at the field, rather than at a point remote therefrom.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. An apparatus for geophysical exploration including, a housing adapted to be connected in a drill stem, means carried by the housing for setting up an electrical field within the media surrounding said housing, a receiver at the surface, and means mounted on the housing effected by the electrical field and connected with the receiver for indicating the physical distortion of the electrical field pattern as caused by the nature and characteristics of the formation.

2. An apparatus for geophysical exploration including, a housing adapted to be connected in a drill stem, means for conducting an electrical current to the housing to set up an electrical field within the media surrounding said housing, a receiver at the surface, means on the housing effected by the electrical field and connected with the receiver for indicating the physical distortion of the electrical field pattern as caused by the nature and characteristics of the formation, means carried by the housing and effected by the temperature surrounding the same, and means at the surface for indicating the temperature variations as they effect said means.

3. An apparatus for geophysical exploration including, a housing adapted to be connected in a drill stem, means for conducting an electrical current to the housing to set up an electrical field within the media surrounding said housing, a receiver at the surface, means on the housing effected by the electrical field and connected with the receiver for indicating the physical distortion of the electrical field pattern as caused by the nature and characteristics of the formation, a thermoresistance coil carried by the housing, and electrical means connected with said coil for indicating changes in its resistance as caused by temperature changes in the bore.

4. An apparatus for geophysical exploration including, a housing adapted to be connected in a drill stem, means carried by the housing for setting up an electrical field within the media surrounding said housing, means for conducting an electrical current to the last named means for actuating the same, means mounted on the housing adjacent the media in which the electrical field is set up for determining the physical distortion of the electrical field pattern, and indicating means at the surface connected with the determining means for visibly indicating the distortion of the field as affected by the nature and characteristics of the formation.

5. An apparatus for geophysical exploration including a housing adapted to be connected in a drill stem, means carried by the housing for setting up an electrical field within the media surrounding said housing, means for conducting an electrical current to the last named means for actuating the same, means mounted on the housing adjacent the media in which the electrical field is set up for determining the physical distortion of the electrical field pattern, indicating means at the surface connected with the determining means for visibly indicating the distortion of the field as affected by the nature and characteristics of the formation, means mounted on the housing for determining the terrestrial temperature of the formation, and means at the surface for indicating such temperature as determined by the last named means.

ROBERT E. LEE.